(12) United States Patent
Heath et al.

(10) Patent No.: US 8,822,390 B2
(45) Date of Patent: Sep. 2, 2014

(54) SCALE INHIBITOR

(75) Inventors: Steve Heath, Aberdeen (GB); Malcolm Todd, Aberdeen (GB)

(73) Assignee: Clariant Finance (BVI) Limited, Tortola (VG)

( * ) Notice: Subject to any disclaimer, the term of this patent is extended or adjusted under 35 U.S.C. 154(b) by 0 days.

(21) Appl. No.: 13/638,440

(22) PCT Filed: Mar. 24, 2011

(86) PCT No.: PCT/EP2011/001468
§ 371 (c)(1),
(2), (4) Date: Sep. 28, 2012

(87) PCT Pub. No.: WO2011/120655
PCT Pub. Date: Oct. 6, 2011

(65) Prior Publication Data
US 2013/0023449 A1    Jan. 24, 2013

(30) Foreign Application Priority Data

Apr. 1, 2010    (EP) ..................................... 10003656

(51) Int. Cl.
*C09K 8/52*    (2006.01)
*E21B 37/06*    (2006.01)

(52) U.S. Cl.
USPC .......................................... 507/241; 507/221

(58) Field of Classification Search
None
See application file for complete search history.

(56) References Cited

U.S. PATENT DOCUMENTS

| | | |
|---|---|---|
| 3,633,672 A | 1/1972 | Smith et al. |
| 4,393,938 A | 7/1983 | Lawson et al. |
| 4,860,829 A | 8/1989 | Carlberg et al. |
| 5,141,655 A | 8/1992 | Hen |
| 5,346,010 A * | 9/1994 | Adams et al. ................. 166/279 |
| 2009/0163389 A1* | 6/2009 | De Campo et al. ........... 507/218 |

FOREIGN PATENT DOCUMENTS

EP        0040442 A1    11/1981

OTHER PUBLICATIONS

SPE17008, Carlberg, B.L, "Scale Inhibitor Precipitation Squeeze for Non-Carbonate Reservoirs",SPE Production Technology Symposium, Lubbock, TX, Nov. 16-17, 1987.
International Search Report for PCT/EP2011/001468, dated May 6, 2011.
International Preliminary Report on Patentability for PCT/EP2011/001468, dated Jun. 27, 2012.

* cited by examiner

*Primary Examiner* — Susannah Chung
*Assistant Examiner* — Kumar R Bhushan
(74) *Attorney, Agent, or Firm* — Tod A. Waldrop

(57) ABSTRACT

This invention relates to a process for inhibiting scaling in a subterranean oil or gas producing formation, comprising adding to the formation a composition comprising a metal chelant, a scale inhibitor and divalent metal cations, wherein the stability constant of the metal chelant-metal cation chelate at ambient temperature is equal to or higher than the stability constant of the chelate formed from the metal cations and the scale inhibitor, and wherein the solubility of the chelate formed from the metal cations and the scale inhibitor decreases with increasing temperature.

8 Claims, No Drawings

SCALE INHIBITOR

This invention relates to a novel scale inhibitor composition, and to a process of inhibiting scale during oilfield operations by applying said scale inhibitor to the water or water/oil emulsion obtained during oilfield operations.

BACKGROUND

Water from natural sources often contains dissolved minerals, with an appreciable presence of ions such as $Ca^{2+}$, $Mg^{2+}$ and, in the case of oilfield formation water, $Ba^{2+}$, $Sr^{2+}$ and $Ra^{2+}$. Under conditions of temperature or pH change, loss of carbon dioxide from solution or admixture with other water containing different mineral content, relatively insoluble species such as carbonates and sulphates may deposit from solution as scale. In offshore oilfields such deposition may be particularly acute when sulphate-containing seawater, pumped underground to aid oil recovery, comes into contact with formation water.

Deposited scale impedes oil recovery and may even become severe enough to block an oilwell. It is therefore a common procedure to treat oilwells with a scale inhibitor to minimize or prevent scale deposition.

In use, a relatively concentrated solution of the scale inhibitor is pumped down the oilwell and flushed out into the formation. From here it leaches back into the produced water, protecting the well and the pipework from scaling.

A careful balance of properties must be achieved. The scale inhibitor does not only have to control scale, but must also on the one hand have sufficient solubility in the waters at the temperatures it will meet to enable placement in the formation without itself prematurely precipitating from solution, whilst on the other hand it must retain strongly enough with in the formation rock to give a suitable slow leach rate. If the scale inhibitor does not adsorb strongly enough it will all leach back very quickly and the well will require re-treatment after a short time. The retention of scale inhibitor can be achieved by adsorption and precipitation processes. Precipitation is a known method for achieving longer scale inhibitor squeeze lifetimes.

PRIOR ART

U.S. Pat. No. 3,633,672 discloses a method of injecting into a formation a scale inhibitor which forms only slightly soluble salts of the inhibitor in neutral to alkali pH. This is performed by injecting a composition containing a highly acidic solution, the inhibitor and a soluble multivalent salt. When the acid is neutralized by the formation the pH rises and the slightly soluble inhibitor salt precipitates. This then slowly dissolves in the produced fluids protecting the production equipment. In practice this technology has been found to be unreliable as there is little control over the rate of reaction and the placement of the precipitate. The formation must be basic in nature hence it is not applicable to a wide range of wells.

U.S. Pat. No. 4,393,938 discloses a method for injecting an acidic solution containing a mixture of scale inhibitor, multivalent and monovalent cations. The multivalent cationic salt of the scale inhibitor is then formed by ion exchange within the formation due to buffering affect of the formation. This method is limited by reservoir type and mineralogy and is often ineffective due to poor yield of the precipitation reaction.

U.S. Pat. No. 5,141,655 discloses a method for injecting an acidic scale inhibitor composition including a soluble multivalent salt and a urea type compound. On placement downhole the urea type compound is thermally decomposed to form a basic solution. At the higher pH the cationic salt of the scale inhibitor is formed and precipitates. At lower temperatures e.g. 40-60° C. the urea type compound would not decompose, the pH would remain the same and the scale inhibitor salt would not precipitate. This process is very much temperature driven and is limited to reservoirs with a bottom hole temperature greater than 80° C.

U.S. Pat. No. 4,860,829 and SPE17008 disclose a method for scale inhibitor injection utilizing a metal chelant with a stability constant lower than the phosphonate scale inhibitor, and a dissolved multivalent salt. This results in the release of the multivalent cations from the chelant. The phosphonate inhibitor then precipitates as the cationic salt. The precipitation reaction occurs immediately on mixing with the other components. Premature precipitation can cause poor product placement in the reservoir. It is claimed that a delay in precipitation can be caused by altering pH. This method is limited as the chelating agent must have a lower stability constant than the phosphonate, thus only a narrow selection of scale inhibitors can be used. Temperature is also a limiting factor as at higher well temperatures the scale inhibitor will precipitate too quickly and product placement will not be accurate.

The scale inhibitors of the prior art, particularly the composition according to U.S. Pat. No. 4,860,829 have the disadvantage of low stability when mixed. Therefore, it is required that the scale inhibitor components according to U.S. Pat. No. 4,860,829 have to be stored separately before their deployment. It has been the object of this invention to provide a scale inhibitor of increased stability, allowing pre-mixing without premature precipitation of the scale inhibitor, particularly of phosphonate salts.

There was a need to find improved compositions suitable to inhibit scaling in a subterranean oil or gas producing formation. Such composition should not contain solid components that may cause problems during the deployment. It is further desirable that the scale inhibitor composition may be delivered and stored as a single component in order to reduce storage costs and deployment complexity. It has been found that adding to the formation a composition comprising metal chelant, a scale inhibitor and metal cations, wherein the stability constant of the metal chelant-metal cation chelate is higher than the stability constant of the chelate formed from the metal cations and the scale inhibitor will inhibit scaling in a subterranean oil or gas producing formation.

DESCRIPTION OF THE INVENTION

The present invention provides a process for inhibiting scaling in a subterranean oil or gas producing formation, comprising adding to the formation a composition comprising a metal chelant, a scale inhibitor and divalent metal cations, wherein the stability constant of the metal chelant-metal cation chelate at ambient temperature is equal to or higher than the stability constant of the chelate formed from the metal cations and the scale inhibitor, and wherein the solubility of the chelate formed from the metal cations and the scale inhibitor decreases with increasing temperature.

The present invention further provides a composition for inhibiting scaling in a subterranean oil or gas producing formation comprising a metal chelant, a scale inhibitor and divalent metal cations, wherein the stability constant of the metal chelant-metal cation chelate at ambient temperature is equal to or higher than the stability constant of the chelate formed from the metal cations and the scale inhibitor, and wherein the solubility of the chelate formed from the metal cations and the scale inhibitor decreases with increasing temperature.

The present invention further provides the use of a composition comprising a metal chelant, a scale inhibitor and divalent metal cations, wherein the stability constant of the metal chelant-metal cation chelate at ambient temperature is equal to or higher than the stability constant of the chelate formed from the metal cations and the scale inhibitor, and wherein the solubility of the chelate formed from the metal cations and the scale inhibitor decreases with increasing temperature for inhibiting scaling in a subterranean oil or gas producing formation.

The present invention relates to the inhibition of scale formation by utilising the precipitation reaction of a slightly insoluble scale inhibitor salt within an oil producing formation. The slow release over time of the scale inhibitor as it dissolves in the produced fluids protects the wellbore and production equipment from harmful scale deposits.

The term ambient temperature refers to a temperature in the range of 0 to 40° C.

The composition for inhibiting scale formation preferably comprises metal cations in a concentration of 1 to 10, specifically 2 to 8 wt.-%.

The composition for inhibiting scale formation preferably comprises at least one scale inhibitor in a concentration of 10 to 50, specifically 20 to 30 wt.-%.

The composition for inhibiting scale formation preferably comprises at least one metal chelant in a concentration of 2 to 40, specifically 5 to 15 wt.-%.

The composition for inhibiting scale formation may comprise water ad 100 wt.-%.

The composition for inhibiting scale formation preferably comprises a phosphonate scale inhibitor.

The composition is preferably adjusted to a pH in the range of 4-14 where, without the chelant, precipitation of the scale inhibitor would occur immediately.

The composition of the invention is indefinitely stable at room temperature as a neat product, and when mixed in any proportion, preferably at 20-99 wt-% of the composition in a medium selected from sea water and modified KCI brines such mixtures are also stable indefinitely. This is because unlike in the process disclosed in U.S. Pat. No. 4,860,829 the metal chelant has a higher stability constant than the phosphonate inhibitor. When the mixture in a medium selected from sea water and modified KCI brines is placed downhole at temperatures of more than 40-150° C. this provides thermal conditions for the solubility limit of the metal ion-scale inhibitor chelate to decrease sufficiently to precipitate over a period of 1-24 hours, depending on pH adjustment. High pH levels will induce slower precipitation of the scale inhibitor, low pH levels will induce faster precipitation of the scale inhibitor. The metal ion-scale inhibitor chelate then precipitates in the formation allowing for slow release of the scale inhibitor in produced fluids. As the composition is stable until placed at a downhole temperature of more than 40-150° C. for 1-24 hours no premature precipitation of the metal ion-scale inhibitor chelate is observed. This gives greater flexibility during pumping than the method dislosed in U.S. Pat. No. 4,860,829.

This technique for scale inhibitor precipitation is not limited to the choice of phosphonate as scale inhibitor. The invention relies on the chelant having an equal or higher stability constant than the scale inhibitor. This means that any scale inhibitor, preferably phosphonates or a variety of polymer scale inhibitors may be deployed according to this invention.

At low temperatures of about 50-70° C. no precipitation is observed for compositions relying on the thermal break down of urea. The thermal breakdown of urea is required to release the pH modifier according to the process disclosed in U.S. Pat. No. 5,141,655. This is not required according to the current invention.

Careful modification of the composition and the pH allows for the precipitation time to be modified for different downhole temperatures. Hence the current invention can be modified for application at higher temperatures (up to 150° C.) without the need for thermal decomposition to produce a pH modifier, such as the decomposition products of urea. In order to work the invention at higher temperatures of e.g. 120 to 150° C. the pH of the composition must be increased in order to achieve precipitation of the scale inhibitor within a time of 2 to 24, preferably 4 to 18 hours. The exact extent of necessary pH increase is scale inhibitor and chelant specific. The extent of precipitation can also be modified for specific needs. This can be done by varying the concentration applied, or by varying the synthetic brine chemistry.

A variety of water soluble metal salts can be used to carry out the described invention. These include as examples salts of metals such as iron, manganese, calcium, cadmium, zinc, tin, nickel, magnesium and barium. Calcium and magnesium are the preferred salts, in particular calcium. In a further preferred embodiment calcium and magnesium are used. The specific salts to be employed are preferably the chlorides or nitrates of the above metals. This invention, however, can be carried out with any metal salt forming a complex with a chelating agent and at deployment conditions the chelating agent releases the metal cations which then form the partially insoluble metal ion-scale inhibitor chelate.

The metal chelate must have a stability constant equal to or higher than that of the scale inhibitor. Thus the preferred chelating agents (chelants) are 1,2-diaminocyclohexane-N, N'-tetraacetic acid, 1,2-bis(2(dicarboxymethyl)aminoethoxy)ethane, ethylene diamine tetra acetic acid (EDTA), diethylenetriamine pentaacetic acid (DTPA), aminobarbituric acid-N,N-diacetic acid, nitroacetic acid, salicylic acid, b-hydroxy butyric acid, 4-sulfoaniline diacetic acid, lactic acid, glycolic acid, glyceric acid, gluconic acid, a-alanine, 3-sulfoaniline diacetic acid, 4-aminobenzoic acid-N,N-diacetic acid, adenosine phosphate, glycine, 3-aminobenzoic acid-N,N-diacetic acid, serine, tyrosine, aniline diacetic acid, N-butylethylenediamine-triacetic acid, aspartic acid, glutamic acid, N-cyclohexylethylenediamine-triacetic acid, N, N'-ethylenebis(2(o-hydroxyphenyl))glycine, tartaric acid, malic acid, b-(N-trimethylammonium ethylimino diacetic acid, disodium 1,2-dihydroxybenzene-3,5-sulfonate, iminodiacetic acid, N-Cyanomethylimino-diacetic acid, adenosine di-phosphate, N-carbethoxy-b-aminoethylimino-diacetic acid, tri-polyphosphoric acid, citric acid, N-methylthioethylimino-diacetic acid, tri-metaphosphoric acid, 8-hydroxyquinoline-5-sulfonic acid, adenosine tri-phosphate, N-methyl-imino-diacetic acid, N-acetamidoimino-diacetic acid, b-aminoethylsulfonic acid-N,N'-tetracetic acid, N-methoxyethylimino-diacetic acid, 2-sulfoaniline diacetic acid, pentamethylenediamine-tetraacedic acid, N-hydroxyethylimino-diacetic acid, ethylenediamine-N,N-diacetic acid, 1,3-diaminocyclohexane-N,N'-tetraacetic acid, b-mercaptoethylimino-diacetic acid, tetra-metaphosphoric acid, nitrilo propionic diacetic acid, tetramethylenediamine-tetraacetic acid, 2-aminobenzoic acid-N,N-diacetic acid, b-aminoethylphosphonic acid-N,N-diacetic acid, N,N-Dihydroxyethylethylenediamine-diacetic acid, ethylendiamine-tetra(methylenephosphonic) acid, nitrilo triacetic acid, N-benzylethylenediamine-triacetic acid, trimethylenediamine-tetraacetic acid, aminomethylphosphonic acid-N,N-diacetic acid, or N-hydroxyethylenediamine-triacetic acid.

Suitable scale inhibitors include diethylenetriamine penta (methylene phosphonic acid), or nitrilo(methylene phosphonic acid) although any phosphonate scale inhibitor can be used as well as a number of polymer based scale inhibitors. These can include methacrylic diphosphonate homopolymer, acrylic acid-allyl ethanolamine diphosphonate copolymer, SVS (sodium vinyl sulphate)-acrylic acid-allyl ammonia diphosphonate terpolymer, acrylic acid-maleic acid-DETA (diethylene triamine) allyl phosphonate terpolymer, polyaspartic acid, polycarboxylates.

Preferred substances for pH adjustment include KOH, NaOH, $NH_3$ and any amine containing compound.

For the purpose of this invention, the stability constant is defined as $$K = \frac{[ML]}{[M][L]}$$

wherein
K means the stability constant,
[ML] means the concentration of the chelate formed from metal cations and either the metal chelant or the scale inhibitor,
[M] means the concentration of the metal cations, and
[L] means the concentration of either the metal chelant or the scale inhibitor.

EXAMPLES

All percentages within this disclosure are weight percentages with respect to the total weight of the respective composition, unless otherwise noted.

Example 1

A composition containing 3 wt.-% $CaCl_2.2H_2O$, 6 wt.-% diethylenetriamine pentaacetic acid (DTPA) and 30 wt.-% diethylenetriamine penta(methylene phosphonic acid) (DETPMP), the pH adjusted with NaOH to between 4.4 and 6.2 was placed in a sample of synthetic sea water. The stability constants for both the DTPA and DETPMP with calcium is $10^{10}$. The solution was completely stable at room temperature for a period of 60 days.

The solution was placed in an oven at 52° C. and monitored for changes in turbidity over time. The time to precipitation was adjusted by changing the neat composition pH. Precipitates were visible within a time period of 2 to 18 hours:

| pH | Time to precipitation (hrs) |
| --- | --- |
| 5.8 | 0.8 |
| 6.1 | 1.25 |
| 6.2 | 2.25 |
| 6.3 | 10 |
| 6.4 | 22.5 |
| 6.7 | no precipitation |

When removed from the temperature of 52° C. and returned to room temperature the precipitate dissolved over a couple of weeks. This indicates that unlike to the process disclosed in U.S. Pat. No. 4,860,829 the chelant does not decompose and that the stability constant changes at elevated temperatures releasing the metal cations. Thus the calcium chelate of diethylenetriamine penta(methylene phosphonic acid) precipitates. It is believed that when returned to ambient conditions the stability constant of the DTPA returns to its higher value and calcium ions are removed from the phosphonate.

Example 2

A composition containing 3 wt.-% $CaCl_2.2H_2O$, 5 wt.-% dithylenetriamine pentaacetic acid (DTPA) and 25 wt.-% Dequest® 2086 (hexamethylene phosphonate) was pH adjusted with KOH to between 7 and 10. A 20 wt.-% solution of the described composition was prepared in a modified KCl brine containing dissolved metal halide salts. The solution was placed in an oven at 52° C. and monitored for changes in turbidity over time. The time to precipitation was adjusted by changing the neat composition pH

| pH | Time to precipitation (hrs) |
| --- | --- |
| 7.2 | 1:10 |
| 8.6 (and higher) | no precipitation |

Example 3

A composition containing 3 wt.-% $CaCl_2.2H_2O$, 6 wt.-% ethylene diamine tetra acetic acid (EDTA) and 30 wt.-% diethylenetriamine penta(methylene phosphonic acid), pH adjusted with NaOH to 6.9 was placed in a sample of synthetic sea water. The solution was placed in an oven at 114° C. and precipitated within a time period of 1.5 hours. This shows that with pH modification the current invention can be utilised at a wide range of temperatures.

Example 4

A composition consisting of 7 wt-% $CaCl_2.2H_2O$, 28% diethylenetriamine pentaacetic acid (DTPA) and 27% of a biodegradable polymaleic acid scale inhibitor was prepared at a pH of 12.5-13. The solution was placed in an oven at 132° C. and it precipitated after 3 and a half hours.

Example 5

A composition consisting of 7 wt-% $CaCl_2.2H_2O$, 28% of trisodium salt of methylglycine diacetic acid (Trilon® M BASF>80% biodegradable) and 27% of a biodegradable sulphonated co-polymer scale inhibitor was prepared at a pH of 14. As there is an ever growing need for bio-degradable scale inhibitors and chelants this package provides both. The solution was placed in an oven at 132° C. and precipitated after an hour and 15 minutes.

The invention claimed is:
1. A process for inhibiting scaling in a subterranean oil or gas producing formation, comprising adding to the formation a composition comprising a metal chelant, a scale inhibitor and 1 to 10 wt.-% of divalent metal cations, wherein the stability constant of the metal chelant-metal cation chelate at ambient temperature is equal to or higher than the stability constant of the chelate formed from the metal cations and the scale inhibitor, and wherein the solubility of the chelate formed from the metal cations and the scale inhibitor decreases with increasing temperature, wherein the pH of the composition is adjusted to 4-14.

2. The process according to claim 1, wherein the scale inhibitor is selected from the group consisting of phosphonic acid, phosphonates and polymeric scale inhibitors.

3. The process according to claim 1, wherein the time between addition of the composition to the formation and precipitation of the scale inhibitor is from 1 to 24 hours.

4. The process according to claim 1, wherein the metal salt is selected from the group consisting of iron manganese, calcium, cadmium, zinc, tin, nickel, magnesium and barium.

5. The process according to claim 1, wherein the metal chelant is selected from the group consisting of 1,2 diaminocyclohexane-N,N'-tetraacetic acid, 1,2 bis(2(dicarboxymethyl)-aminoethoxy)ethane, ethylene diamine tetra acetic acid (EDTA), diethylenetriamine pentaacetic acid (DTPA), aminobarbituric acid-N,N-diacetic acid, nitroacetic acid, salicylic acid, b-hydroxy butyric acid, 4-sulfoaniline diacetic acid, lactic acid, glycolic acid, glyceric acid, gluconic acid, a alanine, 3 sulfoaniline diacetic acid, 4-aminobenzoic acid-N,N-diacetic acid, adenosine phosphate, glycine, 3-aminobenzoic acid-N,N-diacetic acid, serine, tyrosine, aniline diacetic acid, N-butylethylenediamine-triacetic acid, aspartic acid, glutamic acid, N cyclohexylethylenediamine-triacetic acid, N,N'-ethylenebis(2(o-hydroxyphenyl))glycine, tartaric acid, malic acid, b-(N-trimethylammonium ethylimino diacetic acid, disodium 1,2-dihydroxybenzene-3,5-sulfonate, iminodiacetic acid, N cyanomethylimino-diacetic acid, adenosine di-phosphate, N-carbethoxy-b-aminoethylimino-diacetic acid, tri-polyphosphoric acid, citric acid, N methylthioethylimino-diacetic acid, tri-metaphosphoric acid, 8-hydroxyquinoline-5-sulfonic acid, adenosine tri-phosphate, N-methyl-imino-diacetic acid, N acetamidoimino-diacetic acid, b-aminoethylsulfonic acid-N,N'-tetraacetic acid, N methoxyethylimino-diacetic acid, 2-sulfoaniline diacetic acid, pentamethylenediamine-tetraacetic acid, N-hydroxyethyliminodiacetic acid, ethylenediamine-N,N-diacetic acid, 1,3-diaminocyclohexane-N,N'-tetraacetic acid, b mercaptoethylimino-diacetic acid, tetra-metaphosphoric acid, nitrilo propionic diacetic acid, tetramethylenediamine-tetraacetic acid, 2-aminobenzoic acid-N,N-diacetic acid, HDTPA, b-aminoethylphosphonic acid-N,N-diacetic acid, N,N Dihydroxyethylethylenediamine-diacetic acid, ethylendiamine-tetra(methylenephosphonic) acid, nitrilo triacetic acid, N-benzylethylenediamine-triacetic acid, trimethylenediamine-tetraacetic acid, aminomethylphosphonic acid-N,N-diacetic acid and N-hydroxyethylenediamine-triacetic acid.

6. The process according to claim 1, wherein the scale inhibitor is selected from the group consisting of diethylenetriamine penta(methylene phosphonic acid), nitrilo(methylene phosphonic acid) methacrylic diphosphonate homopolymer, acrylic acid-allyl ethanolamine diphosphonate copolymer, SVS-acrylic acid-allyl ammonia diphosphonate terpolymer, acrylic acid-maleic acid-DETA allyl phosphonate terpolymer, polyaspartic acid, and polycarboxylate.

7. The process according to claim 1, wherein pH adjustment is effected by the addition of KOH, NaOH, $NH_3$ or amine compounds.

8. The process according to claim 1, wherein the downhole temperature is between more than 40 to 150° C.

* * * * *